Oct. 30, 1928.
W. C. MORDECAI
1,689,637
ADVERTISING DEVICE
Filed Sept. 18, 1923  2 Sheets-Sheet 1
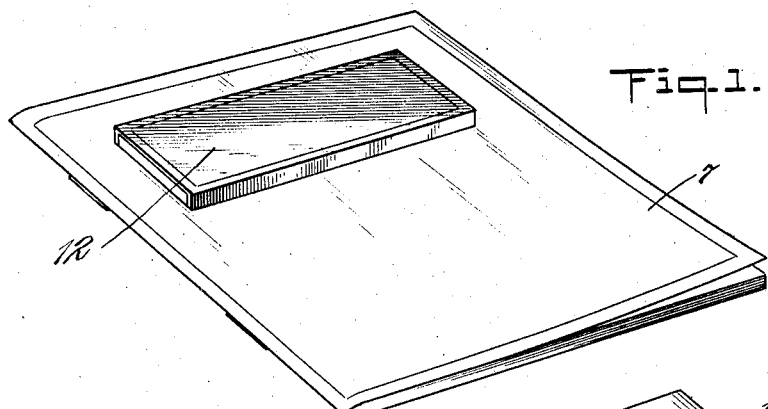
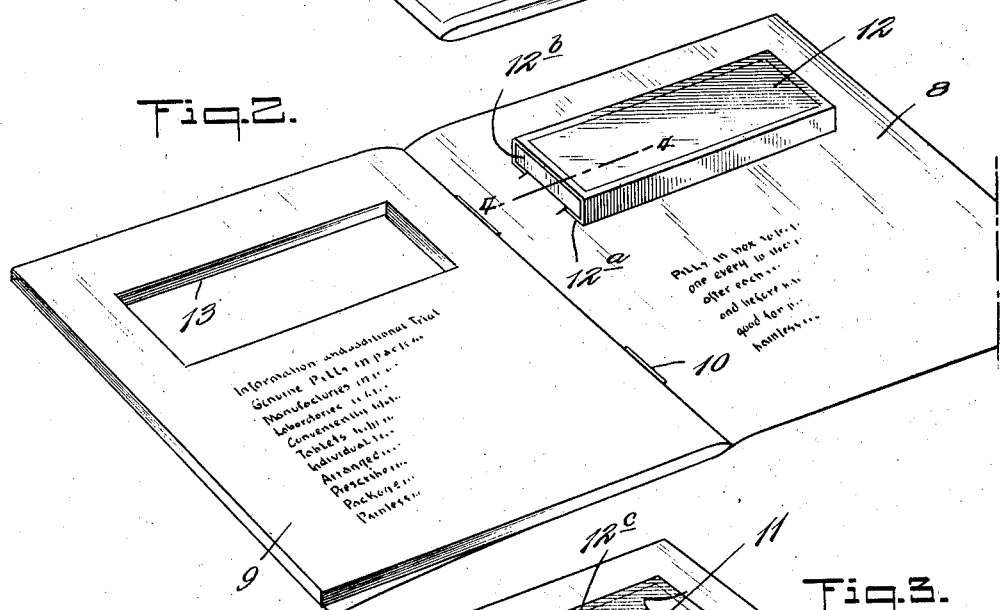
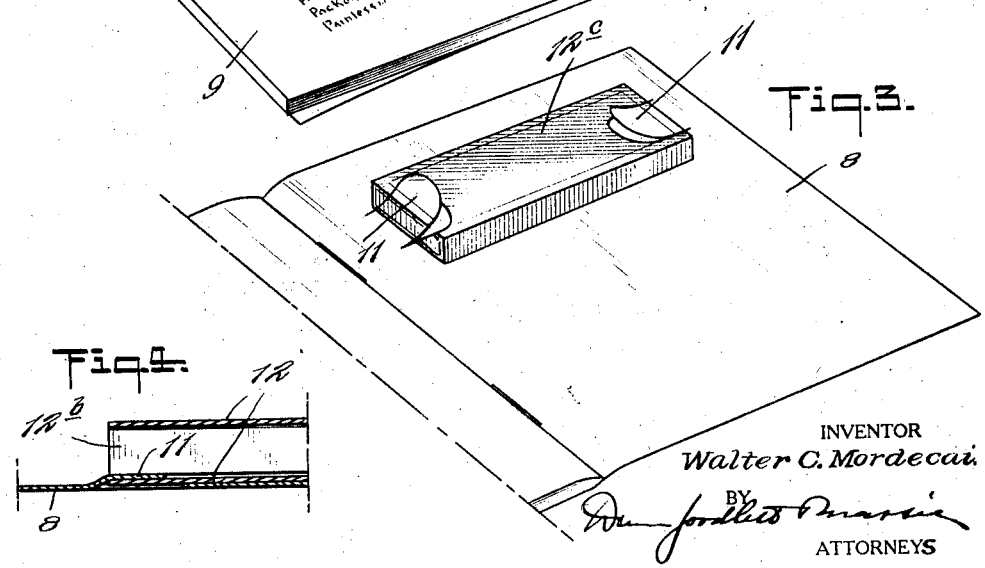
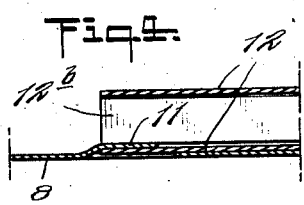
INVENTOR
Walter C. Mordecai.
BY
ATTORNEYS Oct. 30, 1928.
W. C. MORDECAI
ADVERTISING DEVICE
Filed Sept. 18, 1923   2 Sheets-Sheet 2
1,689,637
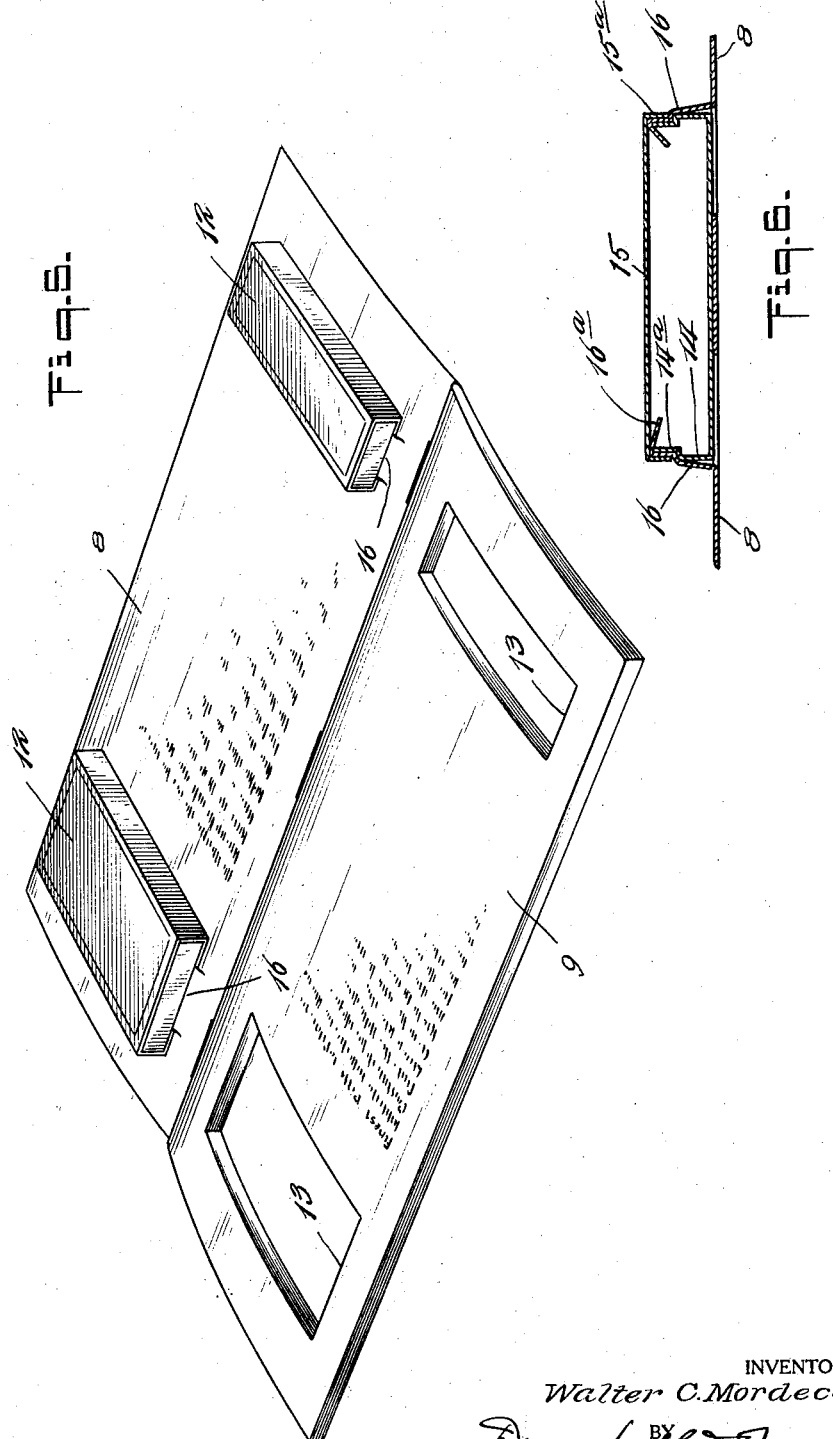
INVENTOR
Walter C. Mordecai
BY
ATTORNEYS Patented Oct. 30, 1928.

1,689,637

UNITED STATES PATENT OFFICE.

WALTER C. MORDECAI, OF KEW GARDENS, NEW YORK.

ADVERTISING DEVICE.

Application filed September 18, 1923. Serial No. 663,414.

The present invention relates generally to advertising devices and is more especially directed to advertising devices which are particularly designed for the distribution of samples or specimens of the goods to be advertised through the mails or otherwise.

In advertising various commodities, it has heretofore been the practice to distribute literature relating thereto, through the mails and other channels usually employed for the purpose and, at a subsequent time, or in some cases, simultaneously distribute samples or specimens of the goods described in the advertising matter or literature. This practice has been found to have many disadvantages, largely from the fact that where the printed matter and the samples of the commodity described therein are distributed at intervals, the literature is frequently lost or destroyed before the samples of the goods are received, so that any interest that may have been created in the commodity advertised is substantially, if not wholly nullified, and the result sought by the advertiser is not attained. On the other hand where the advertising matter and samples of the commodities are simultaneously distributed, they are generally in separate packages and, even where the interest in the goods and the literature pertaining thereto is sufficient to result in the preservation of both, the fact that one is detached from the other in the majority of instances results in the loss of the literature, or the samples of the goods, so that the ultimate result to the advertiser is unsatisfactory.

The general object of the present invention is to eliminate the unsatisfactory results flowing from the practices in the distribution of advertising matter as just described, in a simple and efficient manner, so as to assure the advertiser of a relatively high percentage of returns on the effort and money expended by him in his advertising activities.

In carrying out the aforesaid general object of my invention, it is my purpose to provide an advertising device wherein the description of a certain article or commodity is cooperatively associated with samples or specimens of the article or commodity, in such a manner that the preservation of the advertising matter will result in the preservation of the samples or specimens and vice versa. Furthermore, by the employment of my invention, the recipient of the advertising device, at all times during his examination or perusal of the descriptive matter of the goods, will have the specimens or samples thereof before him. Thus any questions as to the characteristics or qualities of the goods, which may present themselves to him, during such perusal of the descriptive matter, may be readily answered by an immediate examination of the samples or specimens which are always available as a substantially integral part of the advertising device.

Another object of my invention is to so display the samples or specimens that the interest of the recipient is aroused and maintained during his consideration or perusal of the descriptive matter and, at the same time, to provide a compact package which may be readily handled or filed for reference purposes.

My invention also embraces an advertising device having the aforesaid characteristics and advantages, in which the specimens or samples of the goods or articles advertised are detachable from the advertising device, so that in those cases where the recipient may so desire, the samples may be separated from the advertising device and preserved independently thereof. This is also advantageous in that where changes in the form of package used for the samples are made subsequent to the production of the advertising device, the new form of package may be substituted for the original one without the loss which would result were it necessary to discard the complete device.

Other objects and advantages residing in the embodiment of my invention will become apparent as the description proceeds, and I would have it understood that I reserve unto myself all rights to the full range of equivalents, both in structure and use, to which I may be entitled under my invention in its broadest aspect.

For the purposes of the present disclosure, I have elected to illustrate and describe certain preferred embodiments of my invention, as employed for use in advertising small articles such as medicinal or food tablets or the like, which are usually put up in small and compact packages or containers. Of course, my invention is susceptible of use for advertising other forms of goods, any changes and details of structure which are thereby rendered necessary being within the scope of my invention as defined by the appended claims.

In the drawings, Fig. 1 is a view in perspective of an advertising device made in accordance with my invention, which is in the form of a pamphlet, the pamphlet being closed.

Fig. 2 is a view similar to Fig. 1, in which the pamphlet is open to display the back cover which carries the sample or specimens.

Fig. 3 is a fragmentary detail of the structure shown in Fig. 2, illustrating the means employed for attaching the sample package to the back cover of the pamphlet.

Fig. 4 is a sectional view on the line 4—4 of Fig. 2.

Fig. 5 is a view in perspective of a modified form of structure, in which two sample packages are shown; and Fig. 6 is a transverse section of a portion of the back cover, showing a modified form of fastening device for use in securing containers having a removable or slip cover to the back cover of the pamphlet.

Referring now to the drawings in detail, in which like characters of reference are employed to designate similar parts in the several views, the pamphlet which may be of any desired size and outline comprises the usual cover member of any material suitable for the purpose, which is folded in half to provide front and back cover sections 7 and 8, respectively. Disposed between the sections 7 and 8 is a pad of leaves 9, which are bound to the cover member along the aforesaid fold by suitable staples 10, or by any other of the various means employed in the book and pamphlet binding art for such purposes.

It will be observed that back cover section 8 adjacent to its upper edge has oppositely disposed cut out portions forming tabs 11, which are adapted to function as securing means for retaining the sample package 12 in position on the inside of the cover section 8, as clearly shown in Fig. 2. These tabs 11 are spaced a sufficient distance apart so that their free ends may be inserted or interposed between the bottom 12$^a$ of the package cover and the sample container 12$^b$, the package in this particular instance being a box of the so-called telescopic type. Assuming that the cover member of the pamphlet is formed of the usual material employed for such purposes, it will be obvious that the aforesaid tabs 11, while having sufficient yieldability to readily permit of the location and fastening of the package 12 in place, as just described, are of an area which will impart to them sufficient strength to retain the package in position against accidental dislodgment.

The portion of the inner face of the back cover section 8, which is concealed by the package 12 when in position thereon, preferably bears a pictorial representation of the package as indicated at 12$^c$, as in Fig. 3.

The front cover section 7 and each of the leaves of the pad 9 are provided with an aperture 13, which is of the same outline as the package 12, and is adapted to register therewith, so that when the pamphlet is closed, the package 12 will be framed by the said apertures 13, as shown in Fig. 1. It will be obvious that the apertures 13 in the front cover section 7 of the leaves of the pad 9 need not necessarily conform to the outline of the package 12 but, I have found that the construction of my device in the manner described provides a structure which is pleasing in appearance, and in every way responds to the requirements of the advertisers for placing commodities before the trade and public.

The leaves of the pad 9 are designed to carry printed or other matter descriptive of the goods or commodities, the samples of which are contained within the package 12, and it will be evident that by my invention the reader of the matter contained in the leaves of the pamphlet will at all times have within his range of vision, the sample package 12, so that as he peruses the leaves of the pamphlet the make-up and design of the package 12, as well as the name of the goods contained therein, which is usually carried by the package, will be indelibly impressed upon his mind. Furthermore, in the description of the characteristics and uses of the product advertised, certain tests or demonstrations may be suggested in the matter carried by the leaves of the pad 9, which the reader may readily carry out by reason of the fact that the samples or specimens are immediately at hand.

It will be evident that, if the package 12 has been removed from its position on the back cover section 8, the pictorial representation 12$^c$ thereof, will be in registration with the frame formed by the apertures 13 in the front cover section and the leaves of the pad 9, and will serve as a constant reminder of the make-up and form of the package.

In the modification shown in Fig. 5, the advertising device is adapted to carry two sample packages 12 and the front cover section 7, and the leaves of the pad 9 are correspondingly apertured to frame the two packages, as described with reference to the structures of Figures 1 to 4, inclusive.

In Fig. 6, I have shown a sample package which is in the form of a box 14 having a slip cover 15 and means for fastening a container of this type to the back cover section 8. The fastening means in this modified structure comprises tabs 16, which are cut out of the cover section 8, in a manner similar to that followed in the structure shown in Figs. 1 to 5, inclusive, the tabs 16, however, being preferably of a greater length than the tabs 11 so that they may be bent substantially upright with relation to the inner face of the cover section 8, in order to permit the ends 16$^a$ thereof to be turned over the upper edge of the box 14 as shown. It is obvious that the package may be firmly locked to the back cover section 8 by then applying the slip cover 15 to the box 14 thereof, the depending portions of the tabs 16 being frictionally held between the opposed surfaces of the box flange 14ª and the cover flange 15ª.

The pad 9 may be composed of any number of leaves. In some instances, it may be found desirable to make the pamphlet of a thickness corresponding to the height of the sample package 12, while in others greater prominence may be given to the sample package by reducing the thickness of the pamphlet relative to the height of the package 12, so that the latter will protrude beyond the upper surface of the front section 7. Such variations in practicing my invention together with changes in structural details, which may be necessary to meet specific requirements, are manifestly within the scope of my invention.

What I claim is:

1. An advertising device comprising a pamphlet having front and back cover sections, a plurality of leaves adapted to bear descriptive matter secured between said front and back cover sections, and a container for samples detachably secured to the inner face of the back cover section, said container protruding through the leaves and front cover section of the pamphlet.

2. A pamphlet embodying front and back cover sections and a plurality of leaves secured therebetween, the front cover section and all of the leaves of said pamphlet being apertured, and a sample container detachably supported from the back cover section in a position to be framed by the registration of the apertures in the front cover section and the leaves of the pamphlet.

3. A pamphlet for advertising purposes comprising front and back cover sections and a plurality of leaves secured therebetween, the front cover section and leaves being provided with registering apertures, and means formed integral with said back cover section for supporting a sample container thereon in a position to be continuously observable through the apertures in said front cover section and the respective leaves.

4. An advertising device comprising a pamphlet having front and back cover sections and a plurality of leaves secured therebetween, the front cover section and the leaves being provided with registering apertures, a sample container and oppositely disposed tabs formed integral with said back cover section, the free ends of said tabs being adapted to engage said sample container to support the same on said back cover section, said sample container being framed by the registration of the apertures in the front cover section and leaves.

WALTER C. MORDECAI.